United States Patent
Merg et al.

(10) Patent No.: US 10,504,071 B2
(45) Date of Patent: Dec. 10, 2019

(54) METHODS AND SYSTEMS FOR CLUSTERING OF REPAIR ORDERS BASED ON MULTIPLE REPAIR INDICATORS

(71) Applicant: Snap-on Incorporated, Kenosha, WI (US)

(72) Inventors: Patrick S. Merg, Hollister, CA (US); Jacob G. Foreman, Hollister, CA (US); Bradley R. Lewis, Gilroy, CA (US); Brett A. Kelley, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 139 days.

(21) Appl. No.: 15/809,448

(22) Filed: Nov. 10, 2017

(65) Prior Publication Data

US 2018/0068279 A1 Mar. 8, 2018

Related U.S. Application Data

(63) Continuation of application No. 14/933,310, filed on Nov. 5, 2015, now Pat. No. 9,846,860.

(51) Int. Cl.
*G06F 16/20* (2019.01)
*G06Q 10/00* (2012.01)
(Continued)

(52) U.S. Cl.
CPC .......... *G06Q 10/20* (2013.01); *G06F 16/285* (2019.01); *G06F 16/288* (2019.01); *G07C 5/00* (2013.01); *G07C 5/008* (2013.01); *G07C 5/0808* (2013.01)

(58) Field of Classification Search
CPC ...... G07C 5/008; G07C 5/0808; G06Q 10/20; G06F 16/285; G06F 16/287; G06F 16/288
See application file for complete search history.

(56) References Cited

U.S. PATENT DOCUMENTS 6,768,935 B1 * 7/2004 Morgan ................. G06Q 10/10
701/29.6
8,661,039 B2 * 2/2014 Achtermann ......... G06F 16/285
707/737

(Continued)

FOREIGN PATENT DOCUMENTS

| EP | 2239699 A2 | 10/2010 |
| WO | 2002/17118 A2 | 2/2002 |
| WO | 2009/029891 A1 | 3/2009 |

OTHER PUBLICATIONS

International Search Report for corresponding PCT application No. PCT/US2016/060374, dated Feb. 1, 2017.

(Continued)

*Primary Examiner* — Faris S Almatrahi
*Assistant Examiner* — David A Testardi
(74) *Attorney, Agent, or Firm* — McDonnell Boehnen Hulbert & Berghoff LLP

(57) ABSTRACT

A processor may determine that a first repair order (RO) of an existing cluster of ROs (e.g. corresponding to first and second vehicle symptoms and to first and second corrective actions) refers to a first vehicle related to a set of vehicles. The processor may identify ROs that refer to vehicles from the set and may determine among these identified ROs (i) a first relationship between the first symptom and the first action without the first symptom relating to the second action and/or (ii) a second relationship between the second symptom and the second action without the second symptom relating to the first action. The processor may (i) if the first relationship exists, add the first RO to a first different cluster corresponding to the first relationship and (ii) if the second relationship exists, add the first RO to a second different cluster corresponding to the second relationship.

20 Claims, 9 Drawing Sheets

(51) Int. Cl.
*G06F 16/28* (2019.01)
*G07C 5/00* (2006.01)
*G07C 5/08* (2006.01)

(56) References Cited

U.S. PATENT DOCUMENTS

| | | | |
|---|---|---|---|
| 8,862,578 B2 | 10/2014 | Heusermann | |
| 9,201,930 B1 | 12/2015 | Merg | |
| 9,672,497 B1* | 6/2017 | Lewis | G06F 17/277 |
| 9,846,860 B2* | 12/2017 | Merg | G07C 5/008 |
| 10,013,679 B1* | 7/2018 | Lewis | G06Q 10/20 |
| 10,068,207 B2* | 9/2018 | Merg | G06Q 10/00 |
| 10,134,013 B2* | 11/2018 | Merg | G06Q 10/20 |
| 2002/0007237 A1 | 1/2002 | Phung | |
| 2002/0016655 A1 | 2/2002 | Joao | |
| 2004/0199542 A1* | 10/2004 | Morgan | G06Q 10/06 |
| 2006/0161313 A1 | 7/2006 | Rogers | |
| 2006/0184383 A1 | 8/2006 | Davis | |
| 2010/0262332 A1* | 10/2010 | Gilbert | G06Q 10/06 |
| | | | 701/29.6 |
| 2010/0262431 A1 | 10/2010 | Gilbert | |
| 2011/0172874 A1* | 7/2011 | Patnaik | G06F 16/2474 |
| | | | 701/31.4 |
| 2012/0011073 A1* | 1/2012 | Rajpathak | G06F 16/355 |
| | | | 705/305 |
| 2012/0116630 A1* | 5/2012 | Howell | G06Q 10/0639 |
| | | | 701/29.4 |
| 2012/0233132 A1* | 9/2012 | Rajpathak | G06F 16/367 |
| | | | 707/687 |
| 2014/0207515 A1* | 7/2014 | Merg | G06Q 10/20 |
| | | | 705/7.27 |
| 2014/0207771 A1 | 7/2014 | Merg | |
| 2014/0258304 A1* | 9/2014 | Sabanski | G06F 16/904 |
| | | | 707/740 |
| 2014/0277921 A1* | 9/2014 | Gujjar | G06Q 10/20 |
| | | | 701/32.9 |
| 2015/0012169 A1 | 1/2015 | Coard | |
| 2015/0046391 A1 | 2/2015 | Merg | |
| 2015/0066781 A1 | 3/2015 | Johnson | |
| 2015/0142256 A1 | 5/2015 | Jones | |
| 2015/0302667 A1 | 10/2015 | Punjabi | |
| 2015/0324363 A1 | 11/2015 | Merg | |
| 2016/0267723 A1* | 9/2016 | Rajpathak | G06F 16/355 |
| 2017/0032333 A1* | 2/2017 | Merg | G06Q 10/20 |
| 2018/0330339 A1* | 11/2018 | Merg | G06Q 10/00 |
| 2019/0050825 A1* | 2/2019 | Merg | G06Q 10/20 |
| 2019/0050826 A1* | 2/2019 | Merg | G06Q 10/20 |

OTHER PUBLICATIONS

Jagdale, Poonam et al., "An Ontology-Based Text Mining Method to Develop D-Matrix", International Journal of Science and Research (IJSR), vol. 4 Issue 5, May 2015. pp. 2373ff.

Kucheria, Pooonam et al., "Text Mining on Unstructured Data using D-matrix", International Journal of Advanced Research in Computer Science and Software Engineering, vol. 5, Issue 1, Jan. 2015, pp. 754ff.

Rajpathak, Dnyanesh, "An ontology based text mining system for knowledge discovery from the diagnosis data in the automotive domain", Computers in Industry, vol. 64 (2013), pp. 565-580.

Thombare, Tinal R. et al., "D-Matrix: Fault Diagnosis Framework", International Journal of Innovative Research in Computer and Communication Engineering, vol. 3, Issue 3, Mar. 2015, pp. 1740ff.

\* cited by examiner

RTR Car Repair, Tuscaloosa, Alabama — 402
Customer: C. N. Saban — 406
Vehicle: 1997 Ford Crown Vic. 4.6L, V8, (W), Auto Trans. — 408
Complaint: Failed emissions test. Check engine light on. Change oil and filter. — 410, 414
Date: February 18, 2009 — 404
VIN: 1GYSP74WXVR123456 — 432

Service procedure: — 412

| | Time | Rate | Cost |
|---|---|---|---|
| Check DTC — P0171 and P0174. (C45) Check system vacuum and fuel pressures 30/40 PSI. (C117, C245) MAF readings bad. (C772) Cleaned MAF, retested, recalibrated MAF. Verify repair. (C415, R550) — 424, 418 | 0.3 | $100 | $30 |
|  | 0.5 | $100 | $50 |
|  | 1.0 | $100 | $100 |
|  | 0.2 | $100 | $20 |
| Change engine oil and filter. (C085) Lubricate chassis. (C086) — 426, 420 | 0.5 | $50 | $25 |
|  | 0.2 | $50 | $10 |
| Check DTC. Diagnose DTC 117. (C100) Coolant sensor short. R/R coolant sensor. (R199) Verify repair. (V18) — 428, 422 | 0.4 | $100 | $40 |
|  | 0.4 | $100 | $40 |
|  | 0.2 | $100 | $20 |

| Part Description | Part # | Price |
|---|---|---|
| MAF sensor | 6012980 | $89.99 |
| Oil Filter | 6043011 | $19.99 |
| ECT sensor | 6563772 | $73.99 |

Sub-total $183.97
Labor $335.00
Tax $51.90
Total $570.87 — 416

Mileage: 23,411 — 430

| | |
|---|---|
| RO ID: 3915  Repair year 2009 Y/M/M/E: 1997/Ford/Crown Victoria/4.6L, V8, VIN (W) | |
| Work Requested: Customer states the vehicle has failed state emissions certification. Please diagnose and advise. Customer states please replace the MAF sensor. | 508 |
| Work Performed: Technician scan tested and verified the DTC P0171 and DTC P0174. Tested for vacuum leaks and found none at the time. Tested the fuel pump pressure found [[30]] PSI and [[40]] PSI unregulated. Checked the scan data. Found the MAF sensor readings incorrectly. Removed the MAF sensor and cleaned. Found the MAF sensor is not damaged. Recommend recalibration of MAF sensor. Recalibrated MAF sensor. Found the MAF sensor readings correctly. | 510 |
| Meta-data: Customer complaint: failed state emissions certification<br>Pcode: P0171, P0174<br>Component: mass airflow sensor (MAF) (MAF sensor) | 512 |
| Usage indicator: Distance = 23,411 miles | 514 |

```
                                                    ┌─602
DETERMINE, BY AT LEAST ONE PROCESSOR, THAT A FIRST COMPUTER-
READABLE VEHICLE REPAIR ORDER (RO) OF AN EXISTING CLUSTER OF
ROs INCLUDES SPECIFIC DATA THAT REFERS TO A FIRST VEHICLE
RELATED TO A SET OF ONE OR MORE VEHICLES, WHEREIN THE FIRST RO
IS ONE OF A PLURALITY OF ROs STORED WITHIN A COMPUTER
READABLE MEDIUM, AND WHEREIN THE EXISTING CLUSTER IS
ARRANGED TO CONTAIN ROs THAT CORRESPOND TO FIRST AND
SECOND VEHICLE SYMPTOMS AND TO FIRST AND SECOND CORRECTIVE
ACTIONS
                          ↓                         ─604
AFTER DETERMINING THAT THE FIRST RO OF THE EXISTING CLUSTER
INCLUDES THE SPECIFIC DATA, THE AT LEAST ONE PROCESSOR
IDENTIFIES ROs, AMONG THE PLURALITY OF ROs, THAT INCLUDE
FURTHER DATA REFERRING TO AT LEAST ONE VEHICLE FROM THE SET
                          ↓                         ─606
DETERMINE, BY THE AT LEAST ONE PROCESSOR, THAT A GROUP OF ROs,
AMONG THE IDENTIFIED ROs, INCLUDES AT LEAST ONE OF (I) FIRST DATA
REPRESENTATIVE OF A FIRST RELATIONSHIP BETWEEN THE FIRST
VEHICLE SYMPTOM AND THE FIRST CORRECTIVE ACTION WITHOUT THE
FIRST VEHICLE SYMPTOM ALSO RELATING TO THE SECOND CORRECTIVE
ACTION AND (II) SECOND DATA REPRESENTATIVE OF A SECOND
RELATIONSHIP BETWEEN THE SECOND VEHICLE SYMPTOM AND THE
SECOND CORRECTIVE ACTION WITHOUT THE SECOND VEHICLE
SYMPTOM ALSO RELATING TO THE FIRST CORRECTIVE ACTION
                          ↓                         ─608
THE AT LEAST ONE PROCESSOR ADDS THE FIRST RO TO A FIRST
DIFFERENT CLUSTER IF THE GROUP INCLUDES THE FIRST DATA,
WHEREIN THE FIRST DIFFERENT CLUSTER IS ARRANGED TO CONTAIN
ROs THAT CORRESPONDS TO THE FIRST RELATIONSHIP
                          ↓                         ─610
THE AT LEAST ONE PROCESSOR ADDS THE FIRST RO TO A SECOND
DIFFERENT CLUSTER IF THE GROUP INCLUDES THE SECOND DATA,
WHEREIN THE SECOND DIFFERENT CLUSTER IS ARRANGED TO CONTAIN
ROs THAT CORRESPOND TO THE SECOND RELATIONSHIP
```

FIG. 6

```
┌─────────────────────────────────────────────────────────────────────────────┐
│ DETERMINE, BY AT LEAST ONE PROCESSOR, THAT A FIRST COMPUTER-READABLE VEHICLE│
│ REPAIR ORDER (RO) OF AN EXISTING CLUSTER OF ROs INCLUDES SPECIFIC DATA THAT │
│ REFERS TO A FIRST VEHICLE RELATED TO A SET OF ONE OR MORE VEHICLES, WHEREIN │
│ THE FIRST RO IS ONE OF A PLURALITY OF ROs STORED WITHIN A COMPUTER-READABLE │
│ MEDIUM, AND WHEREIN THE EXISTING CLUSTER IS ARRANGED TO CONTAIN ROs THAT    │
│ CORRESPOND TO FIRST AND SECOND VEHICLE SYMPTOMS AND TO AT LEAST ONE         │
│ CORRECTIVE ACTION                                                           │
└─────────────────────────────────────────────────────────────────────────────┘
                                     ↓  —702
┌─────────────────────────────────────────────────────────────────────────────┐
│ AFTER DETERMINING THAT THE FIRST RO OF THE EXISTING CLUSTER INCLUDES THE    │
│ SPECIFIC DATA, DETERMINE, BY THE AT LEAST ONE PROCESSER, WHETHER OR NOT A   │
│ GROUP OF ROs, AMONG THE PLURALITY OF ROs, INCLUDES SYMPTOM-DATA             │
│ REPRESENTATIVE OF A RELATIONSHIP BETWEEN THE FIRST AND SECOND VEHICLE       │
│ SYMPTOMS, WHEREIN THE FIRST RO REMAINS IN THE EXISTING CLUSTER IF THE GROUP │
│ OF ROs, AMONG THE PLURALITY OF ROs, INCLUDES THE SYMPTOM-DATA               │
└─────────────────────────────────────────────────────────────────────────────┘
                                     ↓  —704
┌─────────────────────────────────────────────────────────────────────────────┐
│ IF THE GROUP OF ROs, AMONG THE PLURALITY OF ROs, DOES NOT INCLUDE THE       │
│ SYMPTOM-DATA, THE AT LEAST ONE PROCESSOR IDENTIFIES ROs, AMONG THE          │
│ PLURALITY OF ROs, THAT INCLUDE FURTHER DATA REFERRING TO AT LEAST ONE       │
│ VEHICLE FROM THE SET                                                        │
└─────────────────────────────────────────────────────────────────────────────┘
                                     ↓  —706
┌─────────────────────────────────────────────────────────────────────────────┐
│ DETERMINE, BY THE AT LEAST ONE PROCESSOR, WHETHER OR NOT A FIRST GROUP OF   │
│ ROs, AMONG THE IDENTIFIED ROs, INCLUDES (I) FIRST DATA REPRESENTATIVE OF A  │
│ FIRST RELATIONSHIP BETWEEN THE FIRST VEHICLE SYMPTOM AND THE AT LEAST ONE   │
│ CORRECTIVE ACTION AND (II) SECOND DATA REPRESENTATIVE OF A SECOND           │
│ RELATIONSHIP BETWEEN THE SECOND VEHICLE SYMPTOM AND THE AT LEAST ONE        │
│ CORRECTIVE ACTION, WHEREIN THE FIRST RO REMAINS IN THE EXISTING CLUSTER IF  │
│ THE FIRST GROUP INCLUDES THE FIRST AND SECOND DATA                          │
└─────────────────────────────────────────────────────────────────────────────┘
                                     ↓  —708
┌─────────────────────────────────────────────────────────────────────────────┐
│ IF THE FIRST GROUP DOES NOT INCLUDE THE FIRST AND SECOND DATA, THE AT LEAST │
│ ONE PROCESSOR (A) DETERMINES FIRST AND SECOND CORRECTIVE ACTIONS OF THE AT  │
│ LEAST ONE CORRECTIVE ACTION AND (B) DETERMINES THAT A SECOND GROUP OF ROs,  │
│ AMONG THE IDENTIFIED ROs, INCLUDES AT LEAST ONE OF (I) THIRD DATA           │
│ REPRESENTATIVE OF A THIRD RELATIONSHIP BETWEEN THE FIRST VEHICLE SYMPTOM    │
│ AND THE FIRST CORRECTIVE ACTION WITHOUT THE FIRST VEHICLE SYMPTOM ALSO      │
│ RELATING TO THE SECOND CORRECTIVE ACTION AND (II) FOURTH DATA               │
│ REPRESENTATIVE OF A FOURTH RELATIONSHIP BETWEEN THE SECOND VEHICLE SYMPTOM  │
│ AND THE SECOND CORRECTIVE ACTION WITHOUT THE SECOND VEHICLE SYMPTOM ALSO    │
│ RELATING TO THE FIRST CORRECTIVE ACTION                                     │
└─────────────────────────────────────────────────────────────────────────────┘
                                     ↓  —710
┌─────────────────────────────────────────────────────────────────────────────┐
│ THE AT LEAST ONE PROCESSOR ADDS THE FIRST RO TO A FIRST DIFFERENT CLUSTER   │
│ IF THE SECOND GROUP INCLUDES THE THIRD DATA, WHEREIN THE FIRST DIFFERENT    │
│ CLUSTER IS ARRANGED TO CONTAIN ROs THAT CORRESPOND TO THE THIRD             │
│ RELATIONSHIP                                                                │
└─────────────────────────────────────────────────────────────────────────────┘
                                     ↓  —712
┌─────────────────────────────────────────────────────────────────────────────┐
│ THE AT LEAST ONE PROCESSOR ADDS THE FIRST RO TO A SECOND DIFFERENT CLUSTER  │
│ IF THE SECOND GROUP INCLUDES THE FOURTH DATA, WHEREIN THE SECOND DIFFERENT  │
│ CLUSTER IS ARRANGED TO CONTAIN ROs THAT CORRESPOND TO THE FOURTH            │
│ RELATIONSHIP                                                                │
└─────────────────────────────────────────────────────────────────────────────┘
                                         —714
```

METHODS AND SYSTEMS FOR CLUSTERING OF REPAIR ORDERS BASED ON MULTIPLE REPAIR INDICATORS

INCORPORATION BY REFERENCE

U.S. patent application Ser. No. 14/270,994, filed on May 6, 2014 and which published on Nov. 12, 2015 as U.S. Patent Application Publication No. U.S. 2015/0324363 A1, is incorporated herein by reference, as if fully set forth in this description.

CROSS-REFERENCE TO RELATED APPLICATION

The present application claims priority to U.S. patent application Ser. No. 14/933,310, filed on Nov. 5, 2015 and entitled "Methods and systems for clustering of repair orders based on multiple repair indicators," which is hereby incorporated by reference in its entirety.

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop. A repair shop has traditionally produced a repair order (RO) to capture a variety of information regarding a request for servicing or repairing a product. As an example, the captured information can include information identifying the product, the product's owner, the repair shop, the date of repair, and the type of repair or service needed or performed. The RO can exist in various formats such as a paper format or an electronic format.

Product manufacturers use a significant amount of resources (e.g., human and financial) to generate repair information, such as repair manuals and technical service bulletins, that repair technicians can reference while diagnosing and repairing a product. It may be beneficial to product manufacturers if the repair information can be generated automatically by a computing device. It may be beneficial to product manufacturers and repair technicians if the repair information provided to the repair technicians is automatically generated based on RO information.

OVERVIEW

Example implementations are described herein. In one aspect, a method is disclosed. The method involves determining, by at least one processor, that a first computer-readable vehicle repair order (RO) of an existing cluster of ROs includes specific data that refers to a first vehicle related to a set of one or more vehicles. This first RO is one of a plurality of ROs stored within a computer-readable medium. Also, this existing cluster is arranged to contain ROs that correspond to first and second vehicle symptoms and to first and second corrective actions. The method also involves, after determining that the first RO of the existing cluster includes the specific data, the at least one processor identifying ROs, among the plurality of ROs, that include further data referring to at least one vehicle from the set. The method additionally involves determining, by the at least one processor, that a group of ROs, among the identified ROs, includes at least one of (i) first data representative of a first relationship between the first vehicle symptom and the first corrective action without the first vehicle symptom also relating to the second corrective action and (ii) second data representative of a second relationship between the second vehicle symptom and the second corrective action without the second vehicle symptom also relating to the first corrective action. The method further involves the at least one processor adding the first RO to a first different cluster if the group includes the first data. This first different cluster is arranged to contain ROs that correspond to the first relationship. The method yet further involves the at least one processor adding the first RO to a second different cluster if the group includes the second data. This second different cluster is arranged to contain ROs that correspond to the second relationship.

In another aspect, a computing system is disclosed. The computing system includes a computer-readable medium having stored thereon a plurality of computer-readable vehicle repair orders (ROs). The computing system also includes at least one processor coupled to the computer-readable medium and programmed to determine that a first RO of an existing cluster of ROs includes specific data that refers to a first vehicle related to a set of one or more vehicles. This first RO is one of the plurality of ROs. Also, this existing cluster is arranged to contain ROs that correspond to first and second vehicle symptoms and to first and second corrective actions. The processor is also programmed to, after determining that the first RO of the existing cluster includes the specific data, identify ROs, among the plurality of ROs, that include further data referring to at least one vehicle from the set. The processor is additionally programmed to determine that a group of ROs, among the identified ROs, includes at least one of (i) first data representative of a first relationship between the first vehicle symptom and the first corrective action without the first vehicle symptom also relating to the second corrective action and (ii) second data representative of a second relationship between the second vehicle symptom and the second corrective action without the second vehicle symptom also relating to the first corrective action. The processor is further programmed to add the first RO to a first different cluster if the group includes the first data. This first different cluster is arranged to contain ROs that correspond to the first relationship. The processor is yet further programmed to add the first RO to a second different cluster if the group includes the second data. This second different cluster is arranged to contain ROs that correspond to the second relationship.

In yet another aspect, another method is disclosed. The method involves determining, by at least one processor, that a first computer-readable vehicle repair order (RO) of an existing cluster of ROs includes specific data that refers to a first vehicle related to a set of one or more vehicles. This first RO is one of a plurality of ROs stored within a computer-readable medium. Also, this existing cluster is arranged to contain ROs that correspond to first and second vehicle symptoms and to at least one corrective action. The method also involves, after determining that the first RO of the existing cluster includes the specific data, determining, by the at least one processor, whether or not a group of ROs, among the plurality of ROs, includes symptom-data representative of a relationship between the first and second vehicle symptoms. The first RO remains in the existing cluster if the group of ROs, among the plurality of ROs, includes the symptom-data. The method additionally involves, if the group of ROs, among the plurality of ROs, does not include the symptom-data, the at least one processor identifying ROs, among the plurality of ROs, that include further data referring to at least one vehicle from the set. The method further involves determining, by the at least one processor, whether or not a first group of ROs, among the identified ROs, includes (i) first data representative of a first relationship between the first vehicle symptom and the at least one corrective action and (ii) second data representative of a second relationship between the second vehicle symptom and the at least one corrective action. The first RO remains in the existing cluster if the first group includes the first and second data. The method yet further involves, if the first group does not include the first and second data, the at least one processor (a) determining first and second corrective actions of the at least one corrective action and (b) determining that a second group of ROs, among the identified ROs, includes at least one of (i) third data representative of a third relationship between the first vehicle symptom and the first corrective action without the first vehicle symptom also relating to the second corrective action and (ii) fourth data representative of a fourth relationship between the second vehicle symptom and the second corrective action without the second vehicle symptom also relating to the first corrective action. The method yet further involves the at least one processor adding the first RO to a first different cluster if the second group includes the third data. This first different cluster is arranged to contain ROs that correspond to the third relationship. The method yet further involves the at least one processor adding the first RO to a second different cluster if the second group includes the fourth data. This second different cluster is arranged to contain ROs that correspond to the fourth relationship.

In yet another aspect, another computing system is disclosed. The computing system includes a computer-readable medium having stored thereon a plurality of computer-readable vehicle repair orders (ROs). The computing system also includes at least one processor coupled to the computer-readable medium and programmed to determine that a first RO of an existing cluster of ROs includes specific data that refers to a first vehicle related to a set of one or more vehicles. This first RO is one of the plurality of ROs. Also, this existing cluster is arranged to contain ROs that correspond to first and second vehicle symptoms and to at least one corrective action. The at least one processor is also programmed to, after determining that the first RO of the existing cluster includes the specific data, determine whether or not a group of ROs, among the plurality of ROs, includes symptom-data representative of a relationship between the first and second vehicle symptoms. The first RO remains in the existing cluster if the group of ROs, among the plurality of ROs, includes the symptom-data. The at least one processor is additionally programmed to, if the group of ROs, among the plurality of ROs, does not include the symptom-data, identify ROs, among the plurality of ROs, that include further data referring to at least one vehicle from the set. The at least one processor is further programmed to determine whether or not a first group of ROs, among the identified ROs, includes (i) first data representative of a first relationship between the first vehicle symptom and the at least one corrective action and (ii) second data representative of a second relationship between the second vehicle symptom and the at least one corrective action. The first RO remains in the existing cluster if the first group includes the first and second data. The at least one processor is yet further programmed to, if the first group does not include the first and second data, (a) determine first and second corrective actions of the at least one corrective action and (b) determine that a second group of ROs, among the identified ROs, includes at least one of (i) third data representative of a third relationship between the first vehicle symptom and the first corrective action without the first vehicle symptom also relating to the second corrective action and (ii) fourth data representative of a fourth relationship between the second vehicle symptom and the second corrective action without the second vehicle symptom also relating to the first corrective action. The at least one processor is yet further programmed to add the first RO to a first different cluster if the second group includes the third data. The first different cluster is arranged to contain ROs that correspond to the third relationship. The at least one processor is yet further programmed to add the first RO to a second different cluster if the second group includes the fourth data. The second different cluster is arranged to contain ROs that correspond to the fourth relationship.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows a repair order in accordance with one or more example embodiments.

FIG. 5 shows a repair order including auto-generated repair-hint and meta-data.

FIG. 6 is a flowchart depicting a set of functions that can be carried out in accordance with one or more example embodiments.

FIG. 7 is another flowchart depicting a set of functions that can be carried out in accordance with one or more example embodiments.

DETAILED DESCRIPTION

I. Introduction

Figure 1:
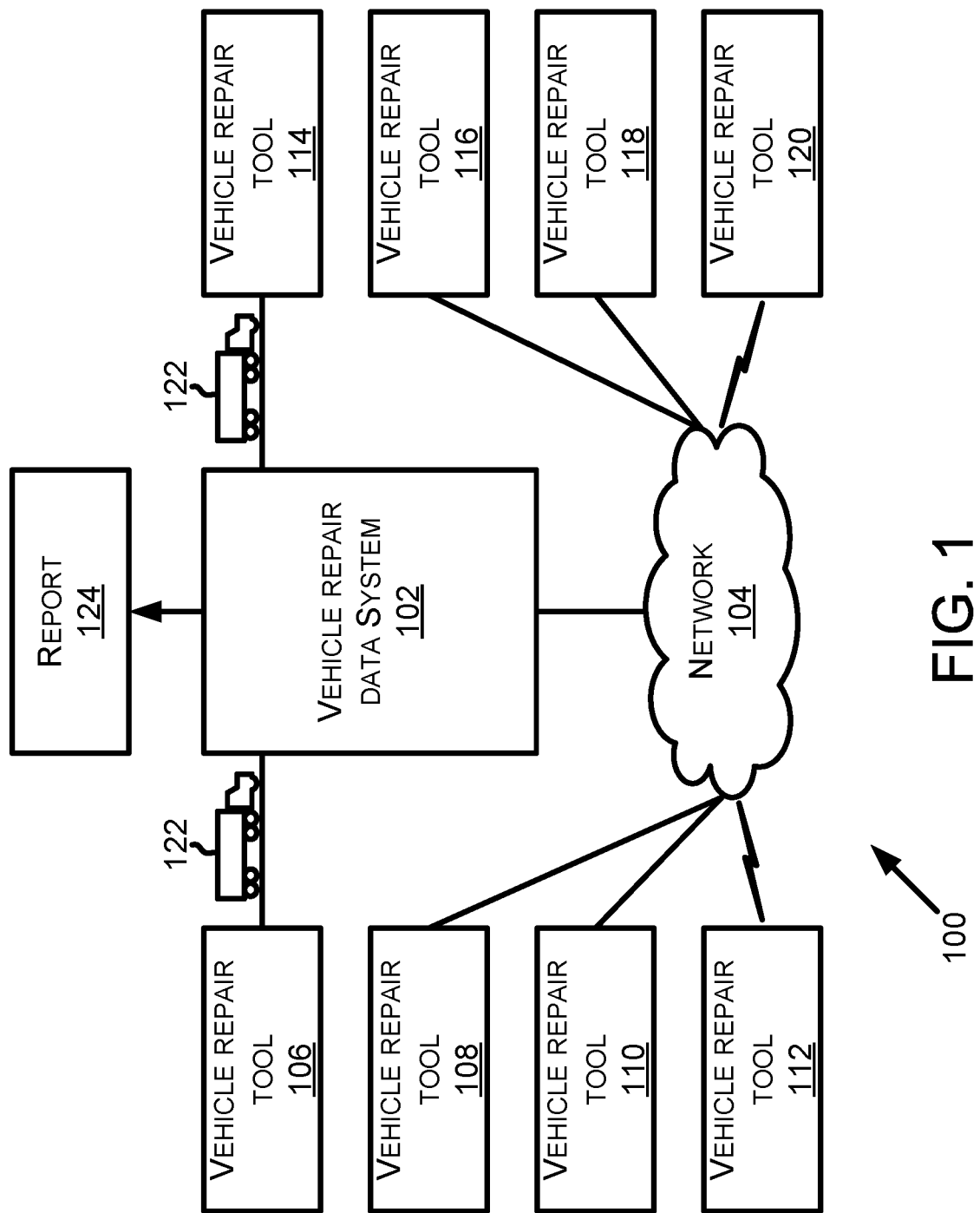
FIG. 1 is a block diagram of a system in accordance with one or more example embodiments.

This description describes several example embodiments including example embodiments regarding multiple repairs. At least some of the example embodiments include, but are not limited to include, one or more of the following features: determining that a first computer-readable vehicle repair order (RO) of an existing cluster of ROs (e.g., arranged to contain ROs that correspond to first and second vehicle symptoms and to first and second corrective actions) includes specific data that refers to a first vehicle related to a set of one or more vehicles, identifying ROs that include further data referring to at least one vehicle from the set, determining that a group of ROs, among the identified ROs, includes at least one of (i) first data representative of a first relationship between the first vehicle symptom and the first corrective action without the first vehicle symptom also relating to the second corrective action and (ii) second data representative of a second relationship between the second vehicle symptom and the second corrective action without the second vehicle symptom also relating to the first corrective action, adding the first RO to a first different cluster (e.g., arranged to contain ROs that correspond to the first relationship) if the group includes the first data, and adding the first RO to a second different cluster (e.g., arranged to contain ROs that correspond to the second relationship) if the group includes the second data.

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

A vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT can include or be arranged as a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
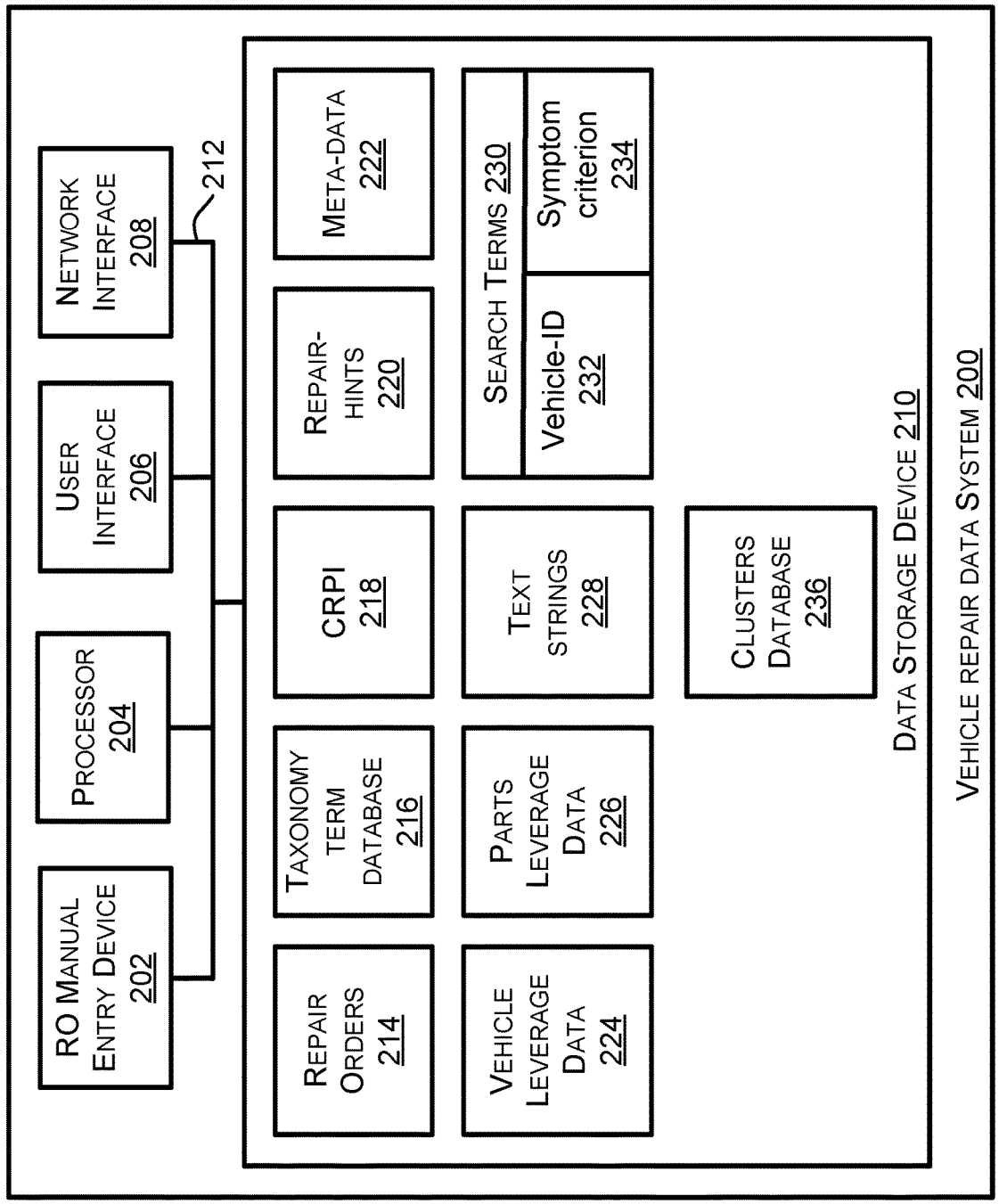
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 can include or be arranged as a machine. VRD system 200 or one or more components thereof can be arranged or referred to as a computing system or a computer system. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times. Processor 204 can be programmed to perform any one or any combination of functions performed by execution of a program instruction of CRPI 218.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as such as data storage device 210 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates the given vehicle, vehicle service requests 410, 412, and 414 indicating the complaint(s) or service(s) requested by the customer, parts information 416 indicating parts obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 word, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 500 (shown in FIG. 5) that represents original RO 400 or data thereon. Additionally or alternatively, presentable RO 500 can be distinct and separate from original RO 400.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214 or after an RO is transferred from one cluster to a different cluster. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |

TABLE 1-continued

| Cluster ID | Cluster Size | DTC | Action | Component(s) |
|---|---|---|---|---|
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | L52 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6, VIN (2) |
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E attributes can lead to search results having RO or repair-hints associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated, or to decrement a cluster size if processor 204 transfers an RO from one cluster to a different cluster.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

CRPI 218 can include program instructions executable by processor 204 to perform any one or more of the operations, functions, or actions illustrated in blocks 602-606 in FIG. 6 and blocks 702-706 in FIG. 7 and as described below in this description.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 510 on RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
|---|---|---|---|
| NSST-227 | 97 Ford Crown Vic. 8 cyl. | Emissions and MAF failed. DTC P171 P174. | SST-15 |
| SST-15 | 1999/Ford/ Crown Victoria/4.6 L V8 (W) | Pcode: P0171, P0174 Component: MAF sensor Work Requested: failed state emissions certification | RO ID 3915 NSST-227 |
| SST-1456 | 2000/Ford/ Crown Victoria/4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle-ID search terms 232 can include various selectable attributes. For example, the attributes of vehicle-ID search terms 232 can include Y/M/M/E attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

FIG. 5 shows an example content of a presentable RO 500 including an RO identifier 502, RO timing information 504, RO vehicle identifier 506, a vehicle service request 508, an auto-generated repair-hint 510, meta-data 512, and a usage indicator 514. Presentable RO 500 is based on service procedure information 418 an original RO 400. RO identifier 502 is "3915," which is also shown in the seventeenth row of Table 2. RO timing information 504 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle identifier 506 includes the year/make/model/engine attributes shown in the seventeenth row of Table 2 for RO ID 3915. Additional or other attributes of the given vehicle identified on original RO 400 can be included on presentable RO 500.

Presentable RO 500 includes elements in or based on original RO 400. Presentable RO 500 can be stored within data storage device 210 with or as part of original RO 400.

Additionally or alternatively, presentable RO 500 can be stored separately and distinctly from original RO 400.

Vehicle service request 508 includes information pertaining to a vehicle service request on an RO within RO 214. Vehicle service request 508 can include one or more text strings from text strings 228. As an example, each sentence within vehicle service request 508 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 512.

Auto-generated repair-hint 510 can include one or more text strings from text strings 228. As an example, each sentence within auto-generated repair-hint 510 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 512 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 510, such as all of the sentences, but the first sentence, within auto-generated repair-hint 510. Processor 204 can select fuel pump pressure readings (e.g., 30 and 40) to insert within the second sentence of that text string, and to select a component name (e.g., MAF sensor) from meta-data 512 or taxonomy term database 216 to insert in the $4^{th}$ through $9^{th}$ sentences of the multiple-sentence text string. Those inserted terms are underlined within FIG. 5.

Meta-data 512 can be stored with presentable RO 500 within RO 214. Additionally or alternatively, meta-data 512 can be stored within meta-data 222 along with a tag or reference to presentable RO 500.

Usage indicator 514 indicates a distance in miles associated with RO 500. Usage indicator 514 can be used by processor 204 to determine whether to select auto-generated repair-hint 510 when searching for a repair-hint based on a set of search terms.

Figure 3:
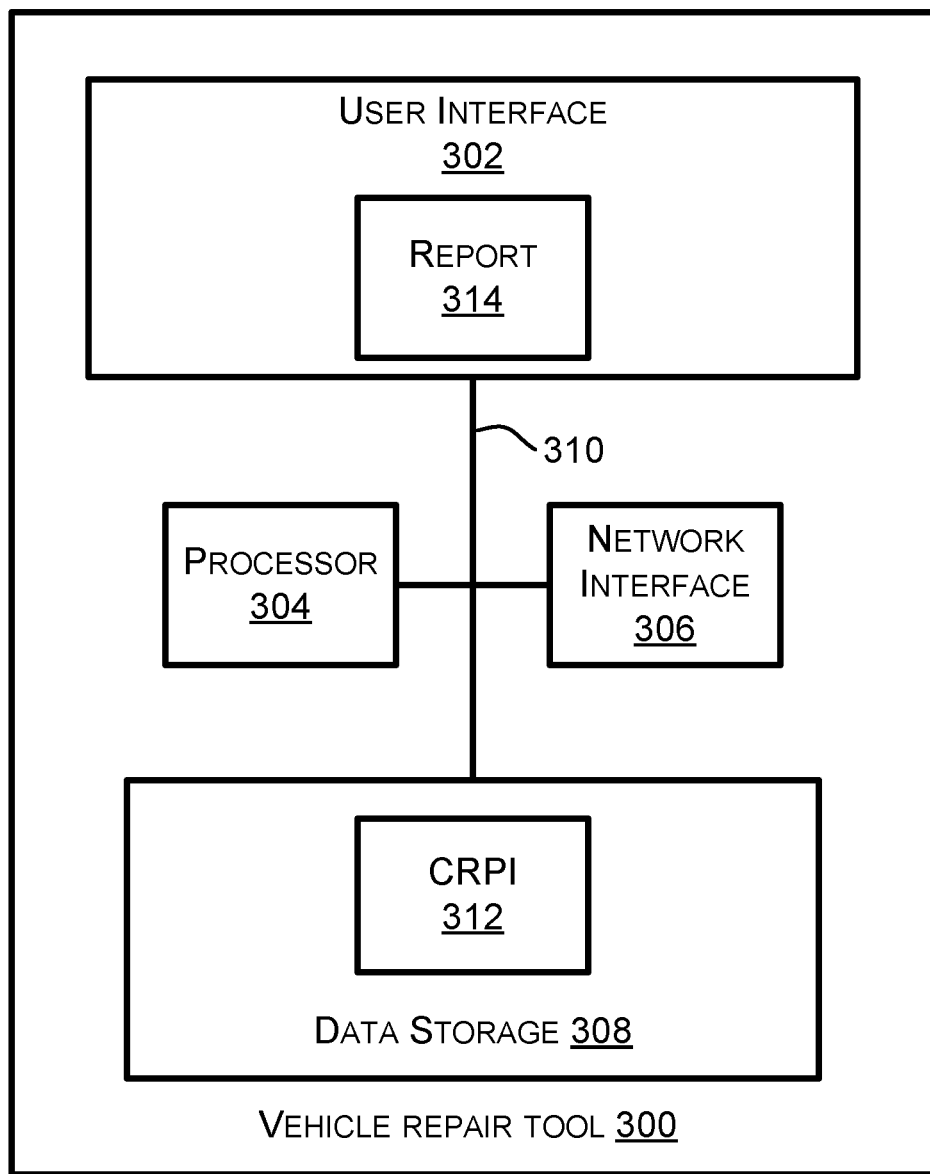
FIG. 3 is a block diagram showing a vehicle repair tool in accordance with one or more example embodiments.

Next, FIG. 3 is a block diagram showing details of example a vehicle repair tool (VRT) 300. VRT 300 can include or be arranged as a machine. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wis. Accordingly, a VRT can also include computer-readable program instructions to perform features such as, but not limited to, guided component tests, an online expert forum, electrical measurements, waveform capture, displaying vehicle records, etc.

III. First Example Operation

FIG. 6 is a flowchart illustrating a method 600, according to an example implementation. Method 600 shown in FIG. 6 (and other processes and methods disclosed herein) presents a method that can be implemented within an arrangement involving, for example, system 100, VRD system 200, and/or VRT 300 (or more particularly by one or more components or subsystems thereof, such as by a processor and a (e.g., non-transitory or transitory) computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves determining, by at least one processor, that a first computer-readable vehicle repair order (RO) of an existing cluster of ROs includes specific data that refers to a first vehicle related to a set of one or more vehicles, where the first RO is one of a plurality of ROs stored within a computer-readable medium, and where the existing cluster is arranged to contain ROs that correspond to first and second vehicle symptoms and to first and second corrective actions.

In an example implementation, a processor (e.g., processor 204) may be configured to evaluate a first RO. This first RO may be one of the ROs 214 stored in data storage device 210, may be a new RO received from RO manual entry device 202, or may be a new RO received from network interface 208 by way of network 104, among other possibilities. Moreover, this first RO can be an original RO, such as an RO generated by a VRT shown in FIG. 1 or entered using RO manual entry device 202, or the first RO may be a presentable RO generated by VRD system 200.

In this implementation, the processor 204 may determine that the first RO corresponds to an existing cluster of ROs. This existing cluster may be a cluster within which the processor 204 has previously associated one or more ROs. Hence, the existing cluster may have a cluster size of at least 1 (one), thereby indicating that at least one RO has been associated with this existing cluster. The at least one RO that has been associated with this existing cluster may be the first RO at issue. That is, the first RO may have already been associated with the existing cluster and thus the existing cluster already contains the first RO. Alternatively, the first RO may be a new RO that has not yet been added to (e.g., associated with) the existing cluster. In this case, the processor 204 may determine that the first RO corresponds to the existing cluster and should thus be added to the existing cluster so as to increase the cluster size.

More specifically, the existing cluster can be associated with particular defined RO attributes, such as with first and second vehicle symptoms as well as with first and second corrective actions for instance. The first vehicle symptom may be a particular DTC, such as DTC P0171 shown in FIG. 4 for example. Alternatively, the first vehicle symptom may be one of the symptom criterion 234, such as "Emissions and MAF failed" shown in Table 5 above for example. Similarly, the second vehicle symptom may be a particular DTC or may be one of the symptom criterion 234. These vehicle symptoms could also take on other forms.

Further, corrective actions may define actions taken to resolve vehicle symptoms, such as to resolve one or both of the first and second vehicle symptoms. Such corrective actions may involve replacement of one or more vehicle component and/or could be defined by way of one or more LOCs, among other possibilities. Hence, the first corrective action may involve replacement of a particular vehicle component or may involve a particular LOC. Similarly, the second corrective action may involve replacement of a particular vehicle component or may involve a particular LOC. These corrective actions could also take on other forms. In either case, the existing cluster may be arranged to contain ROs that correspond to the particular defined RO attributes, such as to the first and second vehicle symptom as well as to the first and second corrective actions for instance.

In an example arrangement, the processor 204 may determine that the first RO corresponds to the existing cluster in one of various ways. For example, if the existing cluster already contains the first RO, the processor 204 may determine that the first RO corresponds to the existing cluster simply by determining that the existing cluster already contains the first RO. For instance, this may involve the processor 204 determining the cluster ID associated with the first RO.

In another example, whether the existing cluster already contains the first RO or whether the first RO is a new RO, the processor 204 may determine that the first RO corresponds to the existing cluster by determining that the first RO includes RO attributes that match the above-mentioned particular defined RO attributes. To do so, processor 204 can search the text, symbols or other content on the first RO or the meta-data associated with the first RO in order to associate the first RO within the existing cluster. For instance, the processor 204 may determine that the first RO includes content related to the first and second vehicle symptom as well as to the first and second corrective actions and may thus associate the first RO with the existing cluster due to the existing cluster being arranged to contain ROs that correspond to the first and second vehicle symptom as well as to the first and second corrective actions. Other examples are also possible.

Table 6 shows data identifying three clusters identified with ID 26 through 28, inclusive. The cluster size indicates how many ROs have been associated with the respective cluster. The cluster size can be modified as or after additional ROs are added to RO 214 or after an RO is transferred from one cluster to a different cluster. Table 6 shows examples of DTC, Action, and component attributes associated with each respective RO cluster. Of course, as noted above in relation to Table 1, Table 6 can be modified to include a separate column for other attributes as well. The other attributes can identify RO attributes such as, but not limited to, a customer complaint, a date, or a labor operation code (LOC).

TABLE 6

| Cluster ID | Cluster Size | DTC | Action | Component(s) |
|---|---|---|---|---|
| 26 | 1,254 | P0302, P0303 | Replaced | Ignition Coil, Spark Plug |
| 27 | 1,516 | P0171, P0325 | Replaced | Oxygen Sensor, Knock Sensor |
| 28 | 984 | P0320, P0302 | Replaced | Crankshaft Position Sensor, Spark Plug |

As shown, these example clusters are each arranged to contain ROs that correspond to first and second vehicle symptom as well as to the first and second corrective actions. For instance, the cluster having a cluster ID of 26 is associated with first and second vehicle symptom taking the form of DTCs P0302 and P0303 as well as with first and second corrective actions taking the form of replacing an ignition coil and replacing a spark plug. Of course, an example cluster could be associated with three or more vehicle symptoms and/or with three or more corrective actions, among other possible combinations. In either case, the above-mentioned existing cluster could be one of the example clusters shown in Table 6, among other possible clusters.

With this example arrangement, the above-mentioned first RO may be one of the ROs in one of the clusters shown in Table 6. For instance, the first RO may be one of the ROs associated with RO cluster ID 26. To illustrate, Table 7 next shows an example of data included on 5 of the 1,254 ROs associated with the RO cluster ID 26 shown in Table 6. The RO data in Table 7 includes an RO identifier that can, for example, be assigned by a VRT or VRD system 102. The RO data in Table 7 also includes year/make/model/engine attributes associated with each RO. Of course, as noted above in relation to Table 2, Table 7 can be modified to include a separate column to include other attributes, such as sub-model attributes for vehicles that are associated with a sub-model attribute.

TABLE 7

| RO ID | Year | Make | Model | Engine |
|---|---|---|---|---|
| 6478 | 2001 | Infiniti | I30 | 3.0 L V6, VIN (C) |
| 2224 | 1999 | Ford | Cutaway E350 | 6.8 L, V10, VIN (S) |
| 4390 | 2005 | Ford | Pickup F250 Super Duty | 5.4 L, V8 VIN (5) |
| 1273 | 2001 | Hyundai | XG300 | 3.0 L V6, VIN (D) |
| 3815 | 2001 | Nissan | Maxima GLE | 3.0 L V6, VIN (C) |

As noted, the processor 204 may determine that the first RO includes specific data that refers to a first vehicle. The processor 204 may do so in various ways. In one example, the processor 204 could refer to meta-data associated with the first RO in order to identify the first vehicle. In another example, the processor 204 may refer to vehicle information 408 such by referring to the vehicle identification number (VIN) 432 associated with the first vehicle and/or to the description of the first vehicle. In this manner, the processor 204 could use the specific data to determine one or more vehicle attributes associated with the first vehicle. These vehicle attributes may include, but are not limited to: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, and (x) a vehicle fuel system type.

Further, the processor 204 may determine that the first vehicle is related to a set of one or more vehicles. The one or more vehicles of the set may all share one or more of the same vehicle attributes. Hence, the first vehicle may be related to the set due to having the same or similar vehicle attributes as those of one or more vehicles of the set. In some cases, the first vehicle may be related to the set due to the set including the first vehicle. In either case, the processor 204 may determine that the first vehicle is related to the set based on an indication (e.g., stored within data storage device 210) that the first vehicle is related to the set. For example, the processor 204 could do so by referring to vehicle leverage data 224 including computer-readable data that identifies different vehicle models built on a common vehicle platform. In another example, the processor 204 could do so by referring to parts leverage data 226 including data that identifies different vehicle models that use a common part produced by one or more part(s) manufacturer. Other examples are also possible.

At block 604, method 600 involves, after determining that the first RO of the existing cluster includes the specific data, the at least one processor identifying ROs, among the plurality of ROs, that include further data referring to at least one vehicle from the set.

In an example implementation, once the processor 204 determines that the first RO includes specific data that refers to a first vehicle related to the set, the processor 204 may identify ROs (e.g., among ROs 214) that are each associated with at least one vehicle from the set. In particular, an RO could be associated with at least one vehicle from the set due to, for instance, having vehicle information 408 that refers to at least one such vehicle from the set. In this implementation, the processor 204 may identify such ROs in various ways. For example, the processor 204 could refer to search terms 230 so as to identify one or more RO IDs associated with a particular vehicle from the set. The processor 204 could do so for some of or all of the vehicles from the set and could thus identify a plurality of RO IDs associated with ROs that each have data referring to at least one vehicle from the set. Other examples are also possible.

At block 606, method 600 involves determining, by the at least one processor, that a group of ROs, among the identified ROs, includes at least one of (i) first data representative of a first relationship between the first vehicle symptom and the first corrective action without the first vehicle symptom also relating to the second corrective action and (ii) second data representative of a second relationship between the second vehicle symptom and the second corrective action without the second vehicle symptom also relating to the first corrective action.

In an example implementation, the processor 204 could evaluate the identified ROs so as to determine various relationships, trends, and/or patterns across the data found in the identified ROs. This may involve evaluating all of the identified ROs or evaluating some of the ROs from among the identified ROs. In either case, determining such relationships could help determine corrective actions that are generally used to resolve various symptoms exhibited by one or more vehicles of the above-mentioned set. Hence, determining such relationships could provide insight regarding the relationship between (i) the first and second corrective actions associated with the first RO and (ii) the first and second vehicle symptoms that were exhibited by the first vehicle associated with the first RO.

In particular, the first RO may correspond to (e.g., may be included in) the existing cluster that corresponds to the first and second corrective action as well as to the first and second vehicle symptoms. However, the existing cluster may be unclear as to what action(s) a repair technician should take after evaluating ROs within the existing cluster (or repair hints based on the existing cluster). In one example, the existing cluster may be unclear as to whether the first corrective action resolves (i) only one of the first and second vehicle symptoms or (ii) both the first and second vehicle symptoms. In another example, the existing cluster may be unclear as to whether the second corrective action resolves (i) only one of the first and second vehicle symptoms or (ii) both the first and second vehicle symptoms. In yet another example, the existing cluster may be unclear as to whether (i) the first corrective action resolves the first vehicle symptom and the second corrective action resolves the second vehicle symptom or (ii) the first corrective action resolves second vehicle symptom and the second corrective action resolves the first vehicle symptom. In yet another example, the existing cluster may be unclear as to whether the second corrective action should be taken if the first corrective action was already taken and vice versa. As further discussed below, determining the appropriate relationships could thus help associate the first RO with one or more different clusters (if necessary) so as to help clarify the particular corrective actions that should be taken to resolve particular vehicle symptoms.

As noted, the processor 204 could determine that a group of ROs, among the identified ROs, includes first data representative of a first relationship between the first vehicle symptom and the first corrective action without the first vehicle symptom also relating to the second corrective action. Determining this first relationship may indicate that the first corrective action should be used to resolve the first vehicle symptom and that the second corrective action is either optional and/or relates to a different vehicle symptom, such as to the second vehicle symptom, among other possibilities. In either case, the processor 204 could make this determination in various ways.

In one example, the processor 204 may evaluate the identified ROs and may determine which of these identified ROs include data (e.g., as part of service procedure information 418) that refers to the first vehicle symptom and to the first corrective action for resolving the first vehicle symptom without also including data that refers to the second corrective action for resolving the first vehicle symptom (and perhaps also do not include data that refers to the second vehicle symptom). In this example, the processor 204 may determine the number of (e.g., a count of) such ROs that each include data referring to the first vehicle symptom and to the first corrective action for resolving the first vehicle symptom without also including data that refers to the second corrective action for resolving the first vehicle symptom. Once the processor 204 determines the count, the processor 204 may determine if the determined count is above a threshold count (e.g., 1,000 ROs). In accordance with this threshold count, if the determined count (e.g., 1,134 ROs) is above the threshold count, the processor 204 determines that the first relationship exists. Whereas, if the determined count (e.g., 282 ROs) is below the threshold count, the processor 204 determines that the first relationship does not exist.

In another example, the processor 204 may use the above-mentioned count as a basis for determining a percentage of the identified ROs that each include data referring to the first vehicle symptom and to the first corrective action for resolving the first vehicle symptom without also including data that refers to the second corrective action for resolving the first vehicle symptom. By way of example, if the number of identified ROs is 1,200 ROs and the count is 600 ROs, then the processor 204 may determine that fifty percent (50%) of the identified ROs each include data referring to the first vehicle symptom and to the first corrective action for resolving the first vehicle symptom without also including data that refers to the second corrective action for resolving the first vehicle symptom. Once the processor 204 determines this percentage, the processor 204 may determine if the determined percentage is above a threshold percentage (e.g., 85%). In accordance with this threshold percentage, if the determined percentage (e.g., 98%) is above the threshold percentage, the processor 204 determines that the first relationship exists. Whereas, if the determined percentage (e.g., 9%) is below the threshold percentage, the processor 204 determines that the first relationship does not exist. Of course, other examples are also possible without departing from the scope of the disclosure.

Similarly, as noted, the processor 204 could determine that a group of ROs, among the identified ROs, includes second data representative of a second relationship between the second vehicle symptom and the second corrective action without the second vehicle symptom also relating to the first corrective action. Determining this second relationship may indicate that the second corrective action should be used to resolve the second vehicle symptom and that the first corrective action is either optional and/or relates to a different vehicle symptom, such as to the first vehicle symptom, among other possibilities. In either case, the processor 204 could make this determination in various ways, such as in the manners discussed above.

In particular, in one example, the processor 204 may evaluate the identified ROs and may determine which of these identified ROs include data (e.g., as part of service procedure information 418) that refers to the second vehicle symptom and to the second corrective action for resolving the second vehicle symptom without also including data that refers to the first corrective action for resolving the second vehicle symptom (and perhaps also do not include data that refers to the first vehicle symptom). In this example, the processor 204 may determine the number of (e.g., a count of) such ROs that each include data referring to the second vehicle symptom and to the second corrective action for resolving the first vehicle symptom without also including data that refers to the first corrective action for resolving the second vehicle symptom. Once the processor 204 determines the count, the processor 204 may determine if the determined count is above a threshold count (e.g., 850 ROs). In accordance with this threshold count, if the determined count (e.g., 1005 ROs) is above the threshold count, the processor 204 determines that the second relationship exists. Whereas, if the determined count (e.g., 54 ROs) is below the threshold count, the processor 204 determines that the second relationship does not exist.

In another example, the processor 204 may use the above-mentioned count as a basis for determining a percentage of the identified ROs that each include data referring to the second vehicle symptom and to the second corrective action for resolving the second vehicle symptom without also including data that refers to the first corrective action for resolving the second vehicle symptom. Once the processor 204 determines this percentage, the processor 204 may determine if the determined percentage is above a threshold percentage (e.g., 75%). In accordance with this threshold percentage, if the determined percentage (e.g., 85%) is above the threshold percentage, the processor 204 determines that the second relationship exists. Whereas, if the determined percentage (e.g., 9%) is below the threshold percentage, the processor 204 determines that the second relationship does not exist. Of course, other examples are also possible without departing from the scope of the disclosure.

At block 608, method 600 involves the at least one processor adding the first RO to a first different cluster if the group includes the first data, where the first different cluster is arranged to contain ROs that correspond to the first relationship. Also, at block 610, method 600 involves the at least one processor adding the first RO to a second different cluster if the group includes the second data, where the second different cluster is arranged to contain ROs that correspond to the second relationship.

In an example implementation, if the processor 204 determines that the above-mentioned first relationship is found among the identified ROs, the processor 204 may add the first RO to a first different cluster. This first different cluster may be arranged to contain ROs that correspond to this first relationship, such as ROs that include data referring to the first vehicle symptom and to the first corrective action for resolving the first vehicle symptom without necessarily also including data that refers to the second corrective action for resolving the first vehicle symptom. Similarly, if the processor 204 determines that the above-mentioned second relationship is found among the identified ROs, the processor 204 may add the first RO to a second different cluster. This second different cluster may be arranged to contain ROs that correspond to this second relationship, such as ROs that include data referring to the second vehicle symptom and to the second corrective action for resolving the second vehicle symptom and to without necessarily also including data that refers to the first corrective action for resolving the second vehicle symptom. In this manner, the processor 204 could add the first RO to one of or both of the first and second different clusters. However, if neither the first or second relationships are found among the identified ROs and/or if other relationship(s) are found among the identified ROs, the processor 204 may take other actions as further discussed in detail below as part of section IV.

The following example situations and arrangements are discussed generally in the context of adding the first RO to a different cluster and should not be seen as limiting. The different cluster discussed in these situations may be the first different cluster or may be the second different cluster. Accordingly, in one example situation (as noted above), the processor 204 may determine that the first RO is a new RO that is received by the processor 204 before the first RO has been added to any of the existing cluster and the different cluster. In this situation, the processor 204 may add the first RO to both the existing cluster and to the different cluster. In another case, the processor 204 may add the first RO to the different cluster without also adding the first RO to the existing cluster. Other cases are also possible.

In another example situation, as noted above, the processor 204 may determine that the first RO is already contained in the existing cluster. In this situation, the processor 204 may add the first RO to the different cluster and may also keep the first RO in the existing cluster such that the first RO is then contained in both the existing cluster and the different cluster. In another case, the processor 204 may add the first RO to the different cluster and may also remove the first RO from the existing cluster such that the first RO is then contained in the different cluster and is no longer contained in the existing cluster. Other cases are also possible.

Figures 8A, 8B:
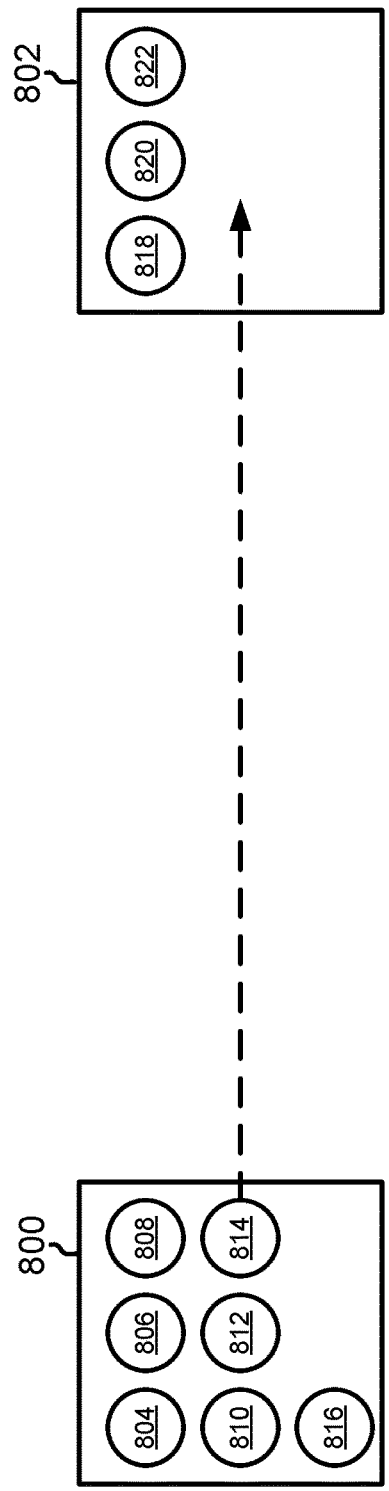
FIGS. 8A to 8B illustrate example movement of an RO between clusters in accordance with one or more examples embodiments.
Figure 9A:
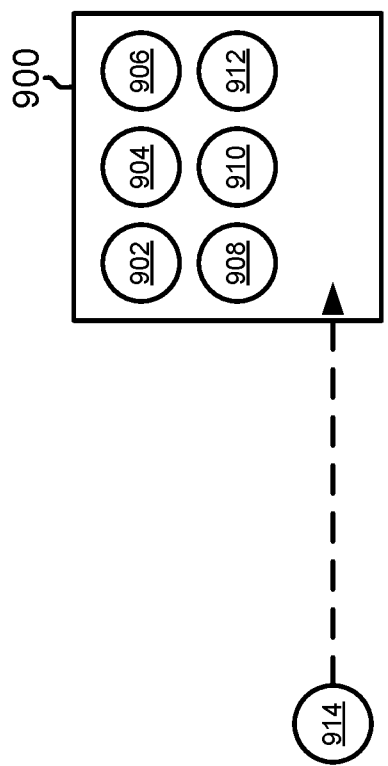
FIGS. 9A to 9B illustrate example addition of a new RO to a cluster in accordance with one or more examples embodiments.
Figure 9B:
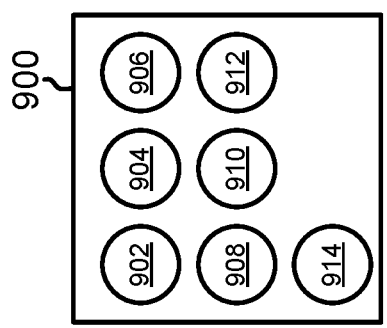

FIGS. 8A to 8B illustrate example of movement of an RO between clusters. In particular, FIG. 8A shows an example cluster 800 containing ROs 804 to 816 as well as example cluster 802 containing ROs 818 to 822. As illustrated, RO 814 is being moved from cluster 800 to cluster 802. Then, after the RO 804 has been moved, FIG. 8B shows the cluster 802 as containing RO 814 and the cluster 800 as no longer containing RO 814. Further, FIGS. 9A to 9B illustrate an example of adding an RO to a cluster. In particular, FIG. 9A shows an example cluster 900 containing ROs 902 to 912. As illustrated, new RO 914 is being added to the cluster 900. Then, after the new RO has been added to the cluster 900, FIG. 9B shows the cluster 900 as containing RO 914. Note that clusters 800, 802, and 900 may be stored in clusters of data storage device 210 (e.g., within clusters database 236 further discussed below). Other illustrations are also possible.

In an example arrangement, the processor 204 may use various techniques to add the first RO to a cluster, to remove the first RO from a cluster, to move the first RO between clusters, and/or to keep the first RO in a cluster. In one case, to add the first RO to a cluster, the processor 204 may generate meta-data to associate the first RO with an appropriate cluster ID and may then store this generated meta-data (e.g., within meta-data 222 along with a tag or reference to the first RO). In another case, to remove the first RO from a cluster, the processor 204 may (i) revise meta-data that associates the first RO with the cluster ID so as to indicate that the first RO is no longer associated with this cluster ID and may then (ii) store this revised meta-data. Alternatively, to remove the first RO from a cluster, the processor 204 may remove meta-data that associates the first RO with the cluster ID such as by removing this meta-data from data storage 210.

In yet another case, to move the first RO between clusters, the processor 204 may revise meta-data that associates the first RO with a first cluster ID so as to indicate within the meta-data that the first RO is no longer associated with this first cluster ID and is rather associated with a second cluster ID. Alternatively, to move the first RO between clusters, the processor 204 may generate meta-data to associate the first RO with a first cluster ID (and may then store this generated meta-data) while also removing or revising meta-data that associates the first RO with a second cluster ID in the manner discussed above. In yet another case, to keep the first RO in a cluster, the processor 204 may simply maintain any meta-data that associates the first RO with this cluster. Other cases are also possible.

In an example implementation, the processor 204 could refer to the data storage 210 to determine whether or not the data storage 210 contains the different cluster. This may specifically involve the processor 204 referring to a clusters database 236 within data storage 210 that includes clusters of ROs. In particular, the clusters database 236 may include all existing IDs associated with clusters of ROs, cluster attributes associated with certain clusters of ROs, and/or meta-data associating certain ROs with certain clusters of ROs (additionally or alternatively, this meta-data could be included within meta-data 222 as discussed above), among others. With this arrangement, the processor 204 may determine whether or not the data storage 210 contains a cluster ID for the different cluster. If the processor 204 determines that the data storage 210 contains the different cluster, the processor 204 may then add the first RO to this different cluster as discussed above. Whereas, if the processor 204 determines that the data storage 210 does not contain the different cluster, the processor 204 may generate this different cluster and may store this generated different cluster in the data storage 210. Once the processor 204 generates this different cluster, the processor 204 may then add the first RO to this different cluster as discussed above. Moreover, the processor 204 may add the cluster ID of the different cluster to the clusters database 236.

The processor 204 may generate the different cluster in one of various ways. For instance, the processor 204 may generate a cluster ID for a combination of vehicle attributes (e.g., meta-data of the attributes) that define the cluster. Such attributes may include particular DTC(s), particular symptom(s), particular component(s), and/or particular labor operation(s) (e.g., particular LOC(s)), among others. By way of example, the processor 204 may assign a particular cluster ID to a combination of "P0101, Replaced, and Mass Airflow Sensor" attributes and may thus associate ROs containing data representative of such attributes with this particular cluster ID. In this manner, different combinations of vehicle attributes may be assigned different cluster IDs. As such, the processor 204 could generate the first different cluster such that the first different cluster is arranged to contain ROs that correspond to the first relationship. Similarly, the processor 204 could generate the second different cluster such that the second different cluster is arranged to contain ROs that correspond to the second relationship. Other examples are also possible.

Table 8 shows data identifying two clusters identified with ID 29 through 30, inclusive. Table 8 shows examples of DTC, Action/LOC, and component attributes associated with each respective RO cluster. Of course, as noted above in relation to Table 1, Table 8 can be modified to include a separate column for other attributes of an RO cluster as well.

TABLE 8

| Cluster ID | Cluster Size | DTC | Action/LOC | Component(s) |
| --- | --- | --- | --- | --- |
| 29 | 124 | P0302 | Replaced | Ignition Coil |
| 30 | 439 | P0303 | Replaced | Spark Plug |

As shown, these example clusters are each arranged to contain ROs that correspond to a particular vehicle symptom and to a particular corrective action to resolve the particular vehicle symptom. For instance, the cluster having a cluster ID of 29 is associated with a vehicle symptom taking the form of DTC P0302 and with replacing an ignition coil. Whereas, the cluster having a cluster ID of 30 is associated with a vehicle symptom taking the form of DTC P0302 and with replacing a spark plug. As discussed above in relation to Table 6, the cluster having a cluster ID of 26 is associated with first and second vehicle symptom taking the form of DTCs P0302 and P0303 as well as with first and second corrective actions taking the form of replacing an ignition coil and replacing a spark plug. As such, if the existing cluster is the cluster having cluster ID 26 shown in Table 6 above, the first different cluster could be cluster ID 29 shown in Table 8 while the second different cluster could be cluster ID 30 shown in Table 8. With this example arrangement, the above-mentioned first RO could be added to one of or both of the clusters shown in Table 8. Other examples are also possible.

IV. Additional Aspects

In an example implementation, once the processor 204 evaluates the first RO and determines the appropriate actions to take with regards to this first RO (e.g., addition of the first RO to the first and/or second different clusters), the processor 204 may evaluate other ROs that are associated with the existing cluster so as to appropriately categorize these other ROs if necessary. For instance, the processor 204 may determine that the existing cluster contains one or more other ROs each including data that refers to at least one vehicle from the above-mentioned set. This determination may thus indicate that these one or more other ROs each have data that refers to at least one vehicle that is related to the first vehicle of the first RO, such as by having some of or the same vehicle attributes for instance.

In this instance, if the processor 204 determined that first relationship exists within the above-mentioned identified ROs, the processor 204 may also add the one or more other ROs to the first different cluster. By way of example, this may specifically involve moving the one or more other ROs from the existing cluster to the first different cluster such that the first different cluster contains the one or more other ROs and such that the existing cluster no longer contains the one or more other ROs. Also, if the processor 204 determined that second relationship exists within the above-mentioned identified ROs, the processor 204 may add the one or more other ROs to the second different cluster. By way of example, this may specifically involve moving the one or more other ROs from the existing cluster to the second different cluster such that the second different cluster contains the one or more other ROs and such that the existing cluster no longer contains the one or more other ROs.

Note that the processor 204 could take such actions automatically after completing evaluation of the first RO. In particular, the processor 204 could do so since the processor 204 already determined whether or not the first and/or second relationships exist among the above-mentioned identified ROs and could thus appropriately categorize other ROs within the existing cluster that have data referring to vehicle(s) from the set.

In a further aspect, as noted above, if neither the first or second relationships are found among the identified ROs and/or if other relationship(s) are found among the identified ROs, the processor 204 may take other actions. For instance, while evaluating the identified ROs, the processor 204 may determine that the identified ROs exhibit an all-around relationship between the first and second corrective actions and the first and second vehicle symptoms. In particular, the processor 204 may determine that a group of ROs, among the identified ROs, include data that is representative of the all-around relationship, such as being representative of both (i) a relationship between (a) the first corrective action and (b) the first and second vehicle symptoms and (ii) a relationship between (a) the second corrective action and (b) the first and second vehicle symptoms. This all-around relationship could thus indicate that both the first and second corrective actions should be taken to resolve the first and second vehicle symptoms. Moreover, this all-around relationship could be determined using the threshold count and/or threshold percentage techniques discussed above. As such, if the processor 204 determines that a group of ROs, among the identified ROs, includes data that is representative of this all-around relationship, the processor 204 may keep the first RO in the existing cluster due to the existing cluster being arranged to contain ROs that correspond to the first and second corrective actions as well as the first and second vehicle symptoms.

In another instance, the processor 204 may determine that no relationships exist at all between the first and second corrective actions and the first and second vehicle components. This could specifically involve determining (e.g., at any order) that the above-mentioned all-around, first, and second relationships do not exist. Upon such a determination, the processor 204 may keep the first RO in the existing cluster and could also generate a report for human review. The purpose of the report is to provide valuable information that could help to manually categorize the first RO into an appropriate cluster. Hence, the report could indicate that the processor 204 determined that that no relationships exist at all between the first and second corrective actions and the first and second vehicle components.

Additionally or alternatively, the report could provide other information that could help appropriately categorize the first RO. For example, the processor 204 could identify one or more other ROs within ROs 214 that have similarities to the first RO at issue. These similarities may involve the other ROs having data indicating the same (or similar) vehicle symptoms and/or the same (or similar) corrective actions. Upon identifying such ROs, the processor 204 could generate the report to list such ROs and/or perhaps to list valuable information included in these ROs.

To illustrate, refer again to FIG. 1 showing that the VRD system 102 may output a report 124. In particular, this report 124 could be displayed as part of a graphical user interface (GUI) on a display of the VRD system. In another case, the VRD system 102 could transmit the report 124 to one or more of the VRTs 106-120 (and/or to other devices) such that a VRT could display this report 124. For instance, VRT 300 of FIG. 3 is shown to display a report 314 (e.g., could be the same as report 124) as part of the user interface 314. In yet another case, the VRD system 102 may store the report 124 in data storage 210 and/or cloud-based data storage so as to make the report 124 accessible for human review via a device (e.g., a VRT). Other cases are also possible.

V. Second Example Operation

FIG. 7 is a flowchart illustrating a method 700, according to an example implementation. Method 700 is related to logically determining that vehicle symptoms are related. At block 702, method 700 involves determining, by at least one processor, that a first computer-readable vehicle repair order (RO) of an existing cluster of ROs includes specific data that refers to a first vehicle related to a set of one or more vehicles, wherein the first RO is one of a plurality of ROs stored within a computer-readable medium, and wherein the existing cluster is arranged to contain ROs that correspond to first and second vehicle symptoms and to at least one corrective action. At block 704, method 700 involves, after determining that the first RO of the existing cluster includes the specific data, determining, by the at least one processor, whether or not a group of ROs, among the plurality of ROs, includes symptom-data representative of a relationship between the first and second vehicle symptoms, wherein the first RO remains in the existing cluster if the group of ROs, among the plurality of ROs, includes the symptom-data. At block 706, method 700 involves, if the group of ROs, among the plurality of ROs, does not include the symptom-data, the at least one processor identifying ROs, among the plurality of ROs, that include further data referring to at least one vehicle from the set. At block 708, method 700 involves determining, by the at least one processor, whether or not a first group of ROs, among the identified ROs, includes (i) first data representative of a first relationship between the first vehicle symptom and the at least one corrective action and (ii) second data representative of a second relationship between the second vehicle symptom and the at least one corrective action, wherein the first RO remains in the existing cluster if the first group includes the first and second data. At block 710, method 700 involves, if the first group does not include the first and second data, the at least one processor (a) determining first and second corrective actions of the at least one corrective action and (b) determining that a second group of ROs, among the identified ROs, includes at least one of (i) third data representative of a third relationship between the first vehicle symptom and the first corrective action without the first vehicle symptom also relating to the second corrective action and (ii) fourth data representative of a fourth relationship between the second vehicle symptom and the second corrective action without the second vehicle symptom also relating to the first corrective action. At block 712, method 700 involves the at least one processor adding the first RO to a first different cluster if the second group includes the third data, wherein the first different cluster is arranged to contain ROs that correspond to the third relationship. At block 714, method 700 involves the at least one processor adding the first RO to a second different cluster if the second group includes the fourth data, wherein the second different cluster is arranged to contain ROs that correspond to the fourth relationship.

As discussed above, the processor 204 can determine that the first RO includes data that refers to a first vehicle related to a set of one or more vehicles and may do so in any of the ways discussed above in association with method 600. In contrast to method 600, however, the first RO in this case is associated with the existing cluster because the existing cluster is arranged to contain ROs that correspond to first and second vehicle symptoms and to at least one corrective action. In either case, after this determination, the processor 204 may determine whether some of or all of the ROs stored in the data storage device 210 include symptom-data that exhibits a relationship between these first and second vehicle symptoms. The processor 204 could do so in one of various ways.

In one example, the processor 204 may evaluate the plurality of stored ROs and may determine which of these stored ROs include data (e.g., as part of service procedure information 418) that refers to both the first and second vehicle symptoms. In this example, the processor 204 may determine the number of (e.g., a count of) such ROs that each include data referring to both the first and second vehicle symptoms. Once the processor 204 determines the count, the processor 204 may determine if the determined count is above a threshold count (e.g., 4,513 ROs). In accordance with this threshold count, if the determined count (e.g., 5,127 ROs) is above the threshold count, the processor 204 determines that the relationship exists. Whereas, if the determined count (e.g., 55 ROs) is below the threshold count, the processor 204 determines that the relationship does not exist.

In another example, the processor 204 may use this count as a basis for determining a percentage of stored ROs that each include data that refers to both the first and second vehicle symptoms. Once the processor 204 determines this percentage, the processor 204 may determine if the determined percentage is above a threshold percentage (e.g., 95%). In accordance with this threshold percentage, if the determined percentage (e.g., 100%) is above the threshold percentage, the processor 204 determines that the relationship exists. Whereas, if the determined percentage (e.g., 12%) is below the threshold percentage, the processor 204 determines that the relationship does not exist. Of course, other examples are also possible without departing from the scope of the disclosure. Regardless of the technique used to determine whether or not the relationship exists, the processor 204 may keep the first RO in the existing cluster if the processor 204 determines that the stored ROs include symptom-data that exhibits a relationship between these first and second vehicle symptoms.

If the processor 204 determines that the stored ROs do not include symptom-data that exhibits a relationship between these first and second vehicle symptoms, the processor 204 may identify ROs (e.g., among the stored ROs) that include data referring to at least one vehicle from the set and may do so in any of the ways discussed above in association with method 600. Once the processor 204 identifies the ROs, the processor 204 may evaluate the identified ROs to determine whether a first group of ROs, among the identified ROs, includes first data representative of a first relationship between the first vehicle symptom and the at least one corrective action. Also, the processor 204 may evaluate the identified ROs to determine whether the first group of ROs, among the identified ROs, includes second data representative of a second relationship between the second vehicle symptom and the at least one corrective action. The processor 204 may do so in one of various ways, such as by using the threshold count and/or threshold percentage techniques discussed above.

For example, with regards to the first relationship, the processor 204 may evaluate the identified ROs and may determine which of these identified ROs include data (e.g., as part of service procedure information 418) that refers to both the first vehicle symptom and the at least one corrective action. In this example, the processor 204 may determine the number of (e.g., a count of) such ROs that each include data referring to both the first vehicle symptom and the at least one corrective action. Once the processor 204 determines the count, the processor 204 may determine if the determined count is above a threshold count (e.g., 1,500 ROs). In accordance with this threshold count, if the determined count (e.g., 3,156 ROs) is above the threshold count, the processor 204 determines that the first relationship exists. Whereas, if the determined count (e.g., 101 ROs) is below the threshold count, the processor 204 determines that the first relationship does not exist.

Then, with regards to the second relationship, the processor 204 may evaluate the identified ROs and may determine which of these identified ROs include data (e.g., as part of service procedure information 418) that refers to both the second vehicle symptom and the at least one corrective action. In this example, the processor 204 may determine the number of (e.g., a count of) such ROs that each include data referring to both the second vehicle symptom and the at least one corrective action. Once the processor 204 determines the count, the processor 204 may determine if the determined count is above a threshold count (e.g., 1,500 ROs). In accordance with this threshold count, if the determined count (e.g., 2,481 ROs) is above the threshold count, the processor 204 determines that the second relationship exists. Whereas, if the determined count (e.g., 34 ROs) is below the threshold count, the processor 204 determines that the second relationship does not exist. Other examples are also possible.

Regardless of the technique used to determine whether or not the first and second relationships exists, the processor 204 may keep the first RO in the existing cluster if the processor 204 determines that the identified ROs include both (i) the first data that exhibits the first relationship and (ii) the second data that exhibits the second relationship. In particular, with this approach the processor 204 essentially determines that the first and second vehicle symptoms are related to one another due to first and second vehicle symptoms each having a separate relationship to the at least one corrective action. Hence, the processor 204 keeps the RO in the existing cluster because the existing cluster is arranged to contain ROs that correspond to the first and second vehicle symptoms and to the at least one corrective action. This result could thus indicate to a repair technician that, if the first vehicle (or perhaps another vehicle from the set) exhibits the first vehicle symptom, then this first vehicle may also exhibit the second vehicle symptom (or vice versa), thereby indicating that the repair technician should use the at least one corrective action to resolve both the first and second vehicle symptoms. Of course, such results could also provide other indications to the repair technician.

In contrast, if the processor 204 determines that the identified ROs do not include both (i) the first data that exhibits the first relationship and (ii) the second data that exhibits the second relationship, the processor 204 may use techniques discussed above in association with method 600 in order to potentially add the first RO to one or more different clusters. In particular, the at least one corrective action may include at least first and second correction actions. Hence, the processor 204 may determine these first and second corrective actions and could do so at any point during or before block 710. Given these first and second correction actions, the processor 204 may further evaluate the identified ROs to determine whether the identified ROs include other data representative of other relationships.

More specifically, the processor 204 may determine that a second group of ROs, among the identified ROs, includes third data representative of a third relationship between the first vehicle symptom and the first corrective action without the first vehicle symptom also relating to the second corrective action. Determining this third relationship may indicate that the first corrective action should be used to resolve the first vehicle symptom and that the second corrective action is either optional and/or relates to a different vehicle symptom, such as to the second vehicle symptom, among other possibilities.

Similarly, the processor 204 may determine that the second group of ROs, among the identified ROs, includes fourth data representative of a fourth relationship between the second vehicle symptom and the second corrective action without the second vehicle symptom also relating to the first corrective action. Determining this fourth relationship may indicate that the second corrective action should be used to resolve the second vehicle symptom and that the first corrective action is either optional and/or relates to a different vehicle symptom, such as to the first vehicle symptom, among other possibilities. Note that the processor 204 could determine these third and fourth relationships using the techniques discussed above in association with method 600.

In an example implementation, if the processor 204 determines that the above-mentioned third relationship is found among the identified ROs, the processor 204 may add the first RO to a first different cluster. This first different cluster may be arranged to contain ROs that correspond to this third relationship, such as ROs that include data referring to the first vehicle symptom and to the first corrective action for resolving the first vehicle symptom without necessarily also including data that refers to the second corrective action for resolving the first vehicle symptom. Similarly, if the processor 204 determines that the above-mentioned fourth relationship is found among the identified ROs, the processor 204 may add the first RO to a second different cluster. This second different cluster may be arranged to contain ROs that correspond to this fourth relationship, such as ROs that include data referring to the second vehicle symptom and to the second corrective action for resolving the second vehicle symptom and to without necessarily also including data that refers to the first corrective action for resolving the second vehicle symptom. In this manner, the processor 204 could add the first RO to one of or both of the first and second different clusters. Note that this addition of the first RO to one or more clusters may be carried out using the techniques discussed above in association with method 600.

Further, if the first, second, third, and/or fourth relationships are not found among the identified ROs and/or if other relationship(s) are found among the identified ROs, the processor 204 may take other actions. In particular, the processor 204 may keep the RO in the existing cluster and may generate a report for human review. The purpose of the report is to provide valuable information that could help to manually categorize the first RO into an appropriate cluster. Hence, the report could indicate that the processor 204 determined that the group of ROs, among the identified ROs, does not include the first, second, third, and/or fourth data. Of course, the report could also provide other information that could help appropriately categorize the first RO. Note that this report could take on the same or similar form to report 124 of FIG. 1 and/or to report 314 of FIG. 3 as discussed above.

VI. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor of a machine cause a set of functions to be performed, the set of functions comprising the features or functions of the aspects and embodiments described herein.

We claim:

1. A method comprising:
    based on a first computer-readable vehicle repair order (RO) being associated with an existing cluster identifier that is stored within a non-transitory computer-readable medium to define an existing cluster of ROs, determining, by at least one processor, that the first RO is contained in the existing cluster of ROs, wherein the first RO is one of a plurality of ROs stored within the non-transitory computer-readable medium, wherein the first RO specifies a first vehicle, wherein the non-transitory computer-readable medium has stored thereon vehicle information indicating one or more other vehicles related to the first vehicle, and wherein the existing cluster of ROs is arranged to contain ROs, but only ROs that specify at least first and second vehicle symptoms and a corrective action;
    after determining that the first RO is contained in the existing cluster of ROs, the at least one processor identifying, among the plurality of ROs, ROs that do not include symptom-data representative of a relationship between the first and second vehicle symptoms;
    based on data stored within the non-transitory computer-readable medium for the identified ROs, making a determination, by the at least one processor, that the first vehicle symptom and the second vehicle symptom are related to the corrective action;
    in response to making the determination, the at least one processor maintaining the first RO in the existing cluster of ROs without moving the first RO from the existing cluster of ROs to another cluster of ROs, wherein the existing cluster of ROs contains a first quantity of ROs after the at least one processor maintains the first RO in the existing cluster of ROs;
    receiving, by the at least one processor via a vehicle repair tool, a request that comprises at least one search term specifying at least the first and second vehicle symptoms;
    making a further determination; by the at least one processor; that the existing cluster of ROs is associated with the at least one search term and that the first quantity of ROs contained in the existing cluster of ROs exceeds a threshold quantity; and
    based at least on the further determination, the at least one processor responding to the request by causing a display device of the vehicle repair tool to display a repair-hint associated with the existing cluster of ROs, wherein the repair-hint specifies at least that the corrective action resolves the first and second vehicle symptoms.

2. The method of claim 1, wherein the existing cluster of ROs is one of a plurality of clusters of ROs each defined by a respective cluster identifier that is stored within the non-transitory computer-readable medium.

3. The method of claim 1; wherein the first RO also specifies the first and second vehicle symptoms and the corrective action, and wherein the first RO is contained in the existing cluster of ROs due to the first RO specifying the first and second vehicle symptoms and the corrective action.

4. The method of claim 1, wherein the first vehicle symptom includes a first diagnostic trouble code (DTC) identifier.

5. The method of claim 4, wherein the second vehicle symptom includes a second diagnostic trouble code (DTC) identifier.

6. The method of claim 1, wherein the first vehicle and the one or more other vehicle all have a same vehicle attribute, and wherein the vehicle attribute comprises one or more of: (i) a vehicle year attribute, (ii) a vehicle make attribute, (iii) a vehicle model attribute, (iv) a vehicle engine attribute, (v) a vehicle system attribute; (vi) a vehicle-year-make-model attribute, (vii) a vehicle-year-make-model-submodel attribute, (viii) a vehicle engine code, (ix) a vehicle drive type, and (x) a vehicle fuel system type.

7. The method of claim 1,
wherein making the determination comprises:
determining a count of ROs, among the identified ROs, that each specify both the first vehicle symptom and the second vehicle symptom; and
determining that the count exceeds a threshold count.

8. The method of claim 1,
wherein making the determination comprises:
determining a percentage of the identified ROs that each specify both the first vehicle symptom and the second vehicle symptom, and
determining that the percentage exceeds a threshold percentage.

9. The method of claim 1,
wherein making the determination comprises:
based on data stored within the non-transitory computer-readable medium for one or more of the identified ROs, determining that the first vehicle symptom is related to the corrective action and separately that the second vehicle symptom is also related to the corrective action; and
based on the determining that the first vehicle symptom is related to the corrective action and separately that the second vehicle symptom s also related to the corrective action, determining that the first vehicle symptom is related to the second vehicle symptom.

10. The method of claim 9, wherein determining that the first vehicle symptom is related to the corrective action comprises:
determining a count of ROs, among the identified ROs, that specify the first vehicle symptom and the corrective action; and
determining that the count exceeds a threshold count.

11. The method of claim 9, wherein determining that the second vehicle symptom is also related to the corrective action comprises:
determining a count of ROs, among the identified ROs, that specify the second vehicle symptom and the corrective action; and
determining that the count exceeds a threshold count.

12. The method of claim 9, wherein determining that the first vehicle symptom is related to the corrective action comprises:
determining that a threshold percentage of the identified ROs specify the first vehicle symptom and the corrective action.

13. The method of claim 9, wherein determining that the second vehicle symptom is also related to the corrective action comprises:
determining that a threshold percentage of the identified ROs specify the second vehicle symptom and the corrective action.

14. A computing system comprising:
a non-transitory computer-readable medium having stored thereon a plurality of computer-readable repair orders (ROs) and vehicle information indicating one or more other vehicles related to a first vehicle; and
at least one processor coupled to the non-transitory computer-readable medium and programmed to:
based on a first RO being associated with an existing cluster identifier that is stored within the non-transitory computer-readable medium to define an existing cluster of ROs, determine that the first RO is contained in the existing cluster of ROs, wherein the first RO is one of the plurality of ROs, wherein the first RO specifies a first vehicle, and wherein the existing cluster of ROs is arranged to contain ROs, but only ROs that specify at least first and second vehicle symptoms and a corrective action;
after determining that the first RO is contained in the existing cluster of ROs, identify, among the plurality of ROs, ROs that do not include symptom-data representative of a relationship between the first and second vehicle symptoms;
based on data stored within the non-transitory computer-readable medium for the identified ROs, make a determination that the first vehicle symptom and the second vehicle symptom are related to the corrective action;
in response to making the determination, maintain the first RO in the existing cluster of ROs without moving the first RO from the existing cluster of ROs to another cluster of ROs, wherein the existing cluster of ROs contains a first quantity of ROs after the at least one processor maintains the first RO in the existing cluster of ROs;
receive, via a vehicle repair tool, a request that comprises at least one search term specifying at least the first and second vehicle symptoms;
make a further determination that the existing cluster of ROs is associated with the at least one search term and that the first quantity of ROs contained in the existing cluster of ROs exceeds a threshold quantity; and
based at least on the further determination; respond to the request by causing a display device of the vehicle repair tool to display a repair-hint associated with the existing cluster of ROs, wherein the repair-hint specifies at least that the corrective action resolves the first and second vehicle symptoms.

15. The computing system of claim 14,
wherein the at least one processor being programmed to make the determination comprises the at least one processor being programmed to:
determine a count of ROs, among the identified ROs, that each specify both the first vehicle symptom and the second vehicle symptom; and
determine that the count exceeds a threshold count.

16. The computing system of claim 14,
wherein the at least one processor being programmed to make the determination comprises the at least one processor being programmed to:
determine a percentage of the identified ROs that each specify both the first vehicle symptom and the second vehicle symptom; and determine that the percentage exceeds a threshold percentage.

17. The computing system of claim 14,
wherein the at least one processor being programmed to make the determination comprises the at least one processor being programmed to:
based on data stored within the non-transitory computer-readable medium for one or more of the identified ROs, determine that the first vehicle symptom is related to the corrective action and separately that the second vehicle symptom is also related to the corrective action; and
based on the determining that the first vehicle symptom is related to the corrective action and separately that the second vehicle symptom is also related to the corrective action, determine that the first vehicle symptom is related to the second vehicle symptom.

18. The computing system of claim 17, wherein the at least one processor being programmed to determine that the first vehicle symptom is related to the corrective action comprises the at least one processor being programmed to:
determine a count of ROs, among the identified ROs, that specify the first vehicle symptom and the corrective action; and
determine that the count exceeds a threshold count.

19. The computing system of claim 17, wherein the at least one processor being programmed to determine that the first vehicle symptom is related to the corrective action comprises the at least one processor being programmed to:
determine that a threshold percentage of the identified ROs specify the first vehicle symptom and the corrective action.

20. A non-transitory computer-readable medium having stored therein instructions executable by at least one processor to cause the at least one processor to perform functions comprising:
based on a first computer-readable vehicle repair order (RO) being associated with an existing cluster identifier that is stored within the non-transitory computer-readable medium to define an existing cluster of ROs, determining that the first RO is contained in the existing cluster of ROs, wherein the first RO is one of a plurality of ROs stored within the non-transitory computer-readable medium, wherein the first RO specifies a first vehicle; wherein the non-transitory computer-readable medium has stored thereon vehicle information indicating one or more other vehicles related to the first vehicle, and wherein the existing cluster of ROs is arranged to contain ROs, but only ROs that specify at least first and second vehicle symptoms and a corrective action;
after determining that the first RO is contained in the existing cluster of ROs, identifying, among the plurality of ROs, ROs that do not include symptom-data representative of a relationship between the first and second vehicle symptoms;
based on data stored within the non-transitory computer-readable medium for the identified ROs, making a determination that the first vehicle symptom and the second vehicle symptom are related to the corrective action;
in response to making the determination, maintaining the first RO in the existing cluster of ROs without moving the first RO from the existing cluster of ROs to another cluster of ROs, wherein the existing cluster of ROs contains a first quantity of ROs after the at least one processor maintains the first RO in the existing cluster of ROs;
receiving, via a vehicle repair tool, a request that comprises at least one search term specifying at least the first and second vehicle symptoms;
making a further determination that the existing cluster of ROs is associated with the at least one search term and that the first quantity of ROs contained in the existing cluster of ROs exceeds a threshold quantity; and
based at least on the further determination, responding to the request by causing a display, device of the vehicle repair tool to display a repair-hint associated with the existing cluster of ROs, wherein the repair-hint specifies at least that the corrective action resolves the first and second vehicle symptoms.

* * * * *